Jan. 27, 1931.   H. E. VAN DORN   1,790,290
COMBINED CAR AND FLUID COUPLER
Filed Nov. 21, 1927   2 Sheets-Sheet 1

Inventor:
H. E. Van Dorn.
By Wm. F. Freudenreich
Atty.

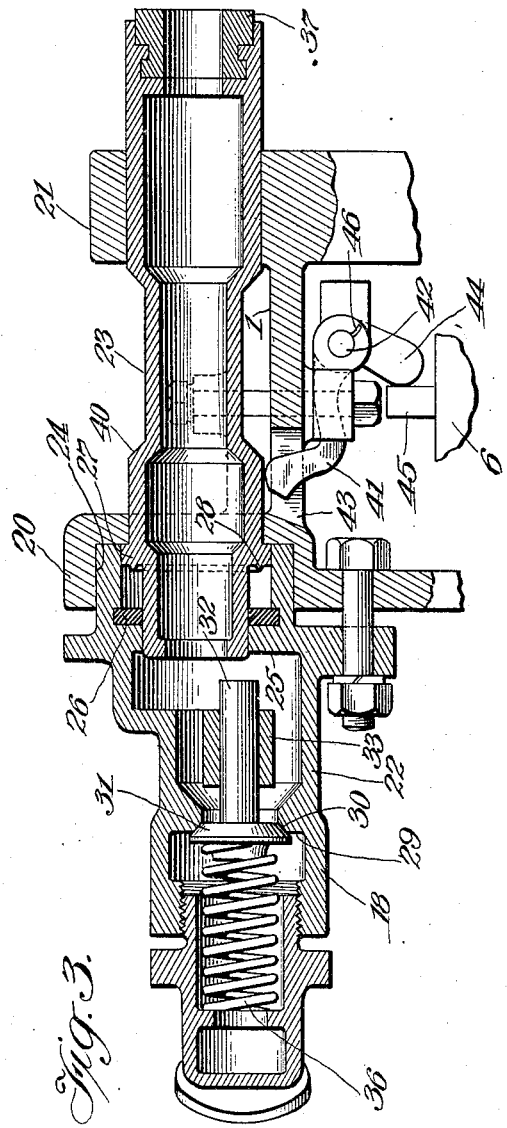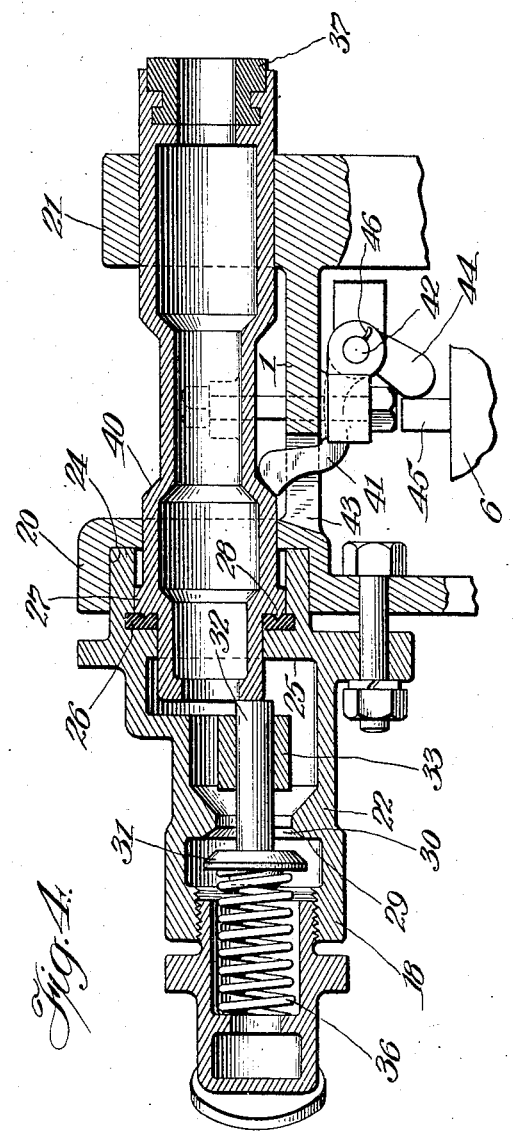

Patented Jan. 27, 1931

1,790,290

UNITED STATES PATENT OFFICE

HERBERT E. VAN DORN, OF CHICAGO, ILLINOIS, ASSIGNOR TO WILLIAM E. VAN DORN, OF PASADENA, CALIFORNIA

COMBINED CAR AND FLUID COUPLER

Application filed November 21, 1927. Serial No. 234,732.

The present invention has for its object to permit air lines or lines for other fluids on two cars to be effectively connected when the two cars are mechanically coupled together, and to cause the lines to be shut off upon uncoupling and be opened when a coupling is made; thus preventing the escape of air or other fluid at times when a coupler is not in actual coupling relation to a companion coupler.

When one of the air lines to be coupled is the brake line which causes the brakes to be set upon a predetermined reduction in pressure therein, it is desirable that such line be not shut off in uncoupling, when the uncoupling is accidental; since, in the case of accidental uncoupling, the brakes should be automatically applied.

Viewed in one of its aspects, the present invention may be said to have for its object to provide means for automatically opening and closing a brake line upon coupling two cars together and intentionally uncoupling them, while causing the line to remain open when the uncoupling is accidental.

Figure 1:
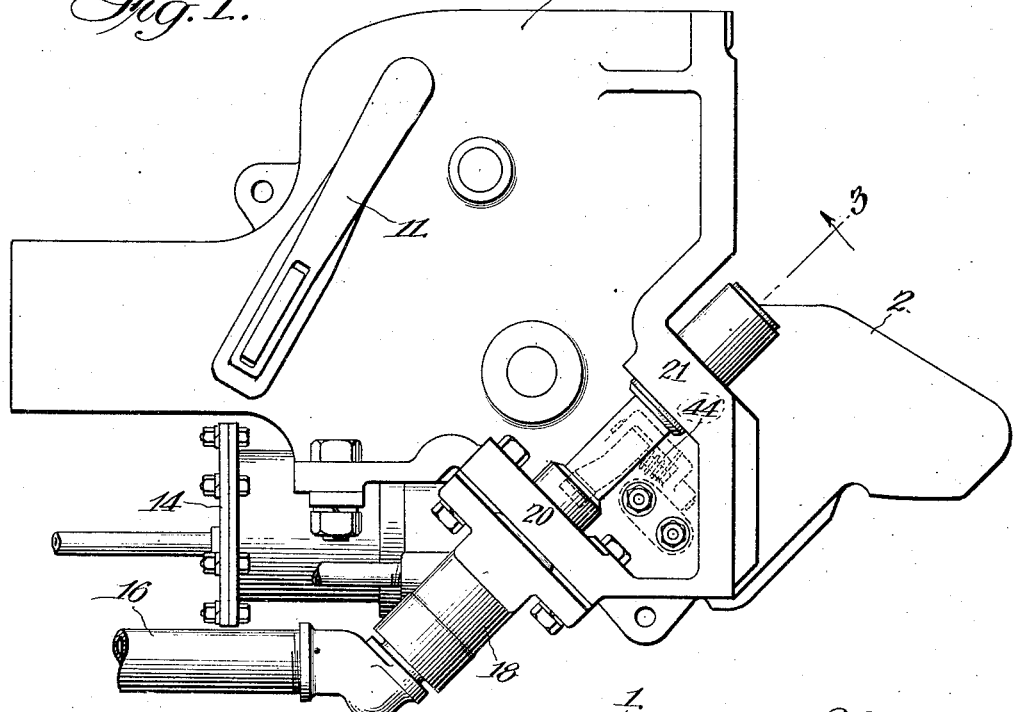
Figure 2:
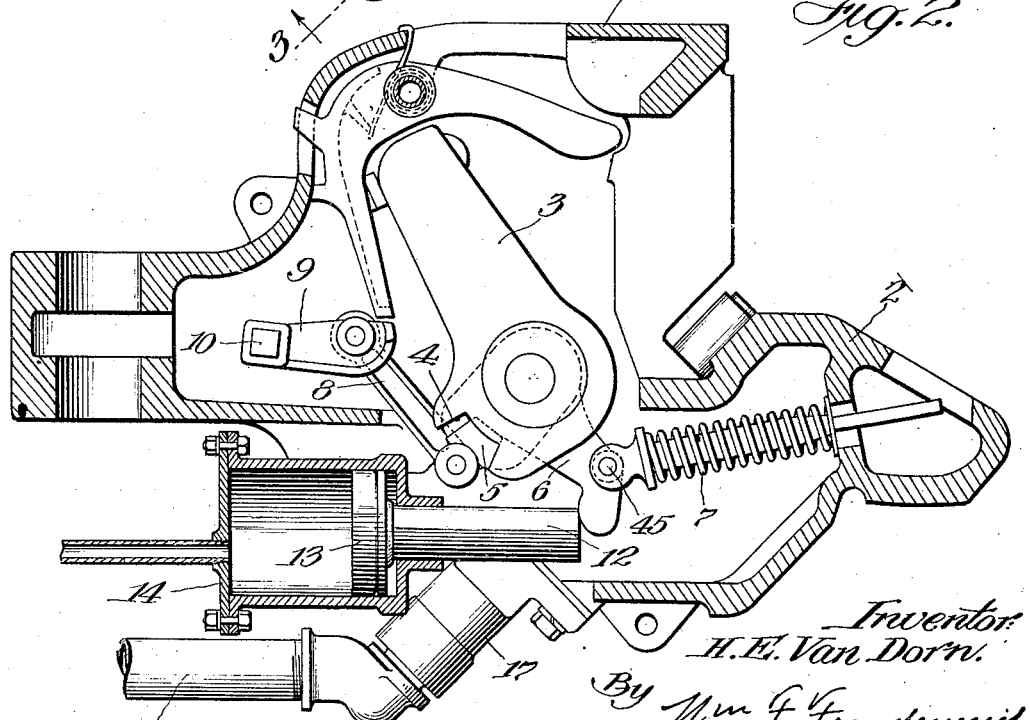

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of an automatic car coupler having my invention applied thereto; Fig. 2 is a horizontal section through the coupler, showing the parts in uncoupled positions; Fig. 3 is a section, on a larger scale, taken on line 3—3 of Fig. 1, only a fragment of the car coupler being shown; and Fig. 4 is a view similar to Fig. 3, showing the parts in different positions, however.

Referring to the drawings, 1 represents the head of an automatic car coupler of any usual or suitable construction, preferably of the type known as a tight-lock coupler. The particular coupler shown in the drawings is disclosed in my Patent No. 1,475,609, to which reference may be had for further details.

Generally speaking, the head is a hollow member open at the front end and having, at one side, a forwardly projecting nose 2 adapted to enter the chamber in a companion coupler and be interlocked with the nose on the latter coupler. In this type of coupler, the final relative movements between two couplers, in the act of coupling or uncoupling, are in lateral directions forming an acute angle with the longitudinal axis of the head. Within the chamber of the head is a locking dog in the form of a swinging bail 3 that embraces the nose on the companion head upon coupling. The locking dog has a notch 4 of greater angular length than that of a projection 5 that extends into the notch from an actuator. The projection moves in unison with a part 6 acted on by a spring 7 in a direction tending to swing the locking dog in the clockwise direction from the position shown in Fig. 2. The projection 5 is connected to a link 8 which is in turn connected to an arm 9 on a vertical rock shaft 10. The shaft 10 extends up through the top of the coupler and is there provided with an actuating handle 11.

The locking dog may also be actuated by means of a stem 12 connected to a piston 13 in an air cylinder 14 mounted on the coupler; the stem engaging directly with the member 6.

It will therefore be seen that whenever the locking bail is swung from a position about at right angles to the longitudinal axis of the head, into its release position as shown in Fig. 2, by either of the means just described, the projection 5 engages the dog at the right hand end of the notch 4. However, if the dog is pushed back from its locking position to its release position by some accidental force, the slack between the dog and the projection 5, on the left hand side of the latter, must first be taken up, so that the projection 5 will travel through a smaller distance during accidental uncoupling than when the uncoupling agencies provided for that purpose are employed. I make use of this difference in the extent of movement of what may be termed some part of the uncoupling devices, depending upon whether the uncoupling is intentionally affected through such devices, or accidentally through some outside agency, in a manner to be hereinafter described.

I have shown the coupler as being provided with means for coupling together two train lines, one of them being the usual train pipe 15, shown in Fig. 2, and the other being the brake pipe 16.

Normally these lines should be closed at the coupler, so as to prevent the escape of air therefrom when there is no coupling connection. However, these lines should be opened after a coupling has been affected, so as to place corresponding pipes on two cars in communication with each other.

The two train lines terminate at the coupler in two conduits fixed one on the underside and the other on the upperside of the coupler head as shown at 17 and 18. Since the construction of these two conduits may be identical, a description of one will suffice for the other. It may be stated that these two conduits lie parallel with each other and at such an angle to the longitudinal axis of the coupler as to be parallel to the direction of movement of two couplers relatively to each other in coupling and uncoupling.

The conduits are mounted in ribs or flanges 20 and 21, of which those on the upperside of the head are shown. The details are best illustrated in Figs. 3 and 4. The conduit is made of two parts, including a stationary casing member 22 fixed to the flange 20, and a slidable tubular member 23 extending through the flanges 20 and 21 and projecting into the casing. The flange 20 has in the outer side a cup-shaped socket 24 into which fits the hollow cylindrical end of the casing 22. There is a transverse partition 25 in the casing, inwardly from the extreme end of the latter, and the tubular member 23 is slidable through an opening in this partition. On the partition is a gasket 26 adapted to be engaged by a flange 27 on the member 23 when the latter is pushed in as far as it will go. The flange 27 is preferably provided with an annular rib 28, triangular in cross-section, for engagement with the gasket to insure good contact and prevent leakage. Within the casing, at some distance from the partition 25, is a second partition 29 having therethrough an opening bounded by a valve seat 30. Engaged with the valve seat is a valve 31 having a stem 32 extending through a suitable guide 33 to a point removed some distance from the partition 25. A spring 36, behind the valve, tends constantly to hold it closed.

The parts are so proportioned that when the tubular section 23 of the conduit is pushed in it will engage with the end of the valve stem and unseat the valve. When the tubular member 23 is no longer held against outward movement, the spring behind the valve asserts itself and closes the valve, pushing the tubular member out ahead of it.

The outer end of the tubular member 23 is provided with a facing 37 of rubber or the like.

When two cars are brought together, the tubular air coupling members on one coupler engage with the corresponding members on the cooperating or companion coupler. As the couplers approach their coupling positions they are moving in a direction parallel with the longitudinal axes of the tubular conduit sections, so that these sections are pushed back, without binding in their guides. When the rubber faced end of one tubular member engages with the corresponding member on the other coupler, a tight joint is made between such tubular members, so that air cannot leak out through the joint. During the final closing movements of the couplers, the movable air conduit sections are carried back or inward far enough to open the valves in the corresponding train lines. Therefore the train lines, which are normally shut off at the couplers, will be automatically opened during the process of coupling them together. Similarly, as the couplers separate during ordinary uncoupling, the meeting ends of the tubular members are held together by the pressure of the springs behind the valves, as the tubular members are forced outwardly by such springs until the valves have become seated and shut off the air lines in rear of the movable conduit sections; so that the air cannot escape from the lines when the joint between two engaged movable conduit sections is broken.

Sometimes cars are accidentally uncoupled, the locking dog in the coupler head being forced back by forces operating otherwise than through the usual uncoupling devices. In such a case it is desirable that the air be permitted to escape from the brake pipe so as to produce an application of the brakes. I have therefore provided means whereby the valve in the brake pipe will be held open upon accidental uncoupling. In the particular arrangement shown, the tubular member 23 has its diameter reduced in that portion spanning the space between the ribs or flanges 20 and 21, providing an outwardly facing annular shoulder 40. Underneath the top wall of the coupler head is a catch 41 mounted to swing on a horizontal pivot 42. The nose of the catch extends upward through a hole 43 in the top wall of the coupler head. A spring 46 tends constantly to hold the catch with its nose projected upwardly. When the parts are in uncoupled positions the catch underlies the portion of large diameter of the member 23 inwardly from the shoulder 40. When the tubular member is pushed in as far as it will go, the catch swings up in front of the annular shoulder and prevents the tubular member from again moving outward until the catch is released. The catch is provided with a downwardly projecting finger 44 by means of which the catch may be tripped. In order to trip the catch, I provide some part of the unlocking mechanism of the coupler, that is the mechanism by means of which the locking bail is swung into its released position, with a shoulder or projection that will engage the finger 44 during the final movements of such mechanism in uncoupling, for the purpose of tripping the catch and holding it in its release position. In the arrangement shown, I have extended upwardly a pin 45 already present on the part 6 of the mechanical coupler; this pin being properly located to trip the catch.

When the locking bail in the coupler head is swung into its release position, as illustrated in Fig. 2, by the uncoupling mechanism, actuated either through the handle 11 or the piston 13, the pin 45 is moved into the position shown in Fig. 3. During the final portion of the movement of the pin 45 it engages the finger on the catch and swings the catch down. As heretofore explained, the part 6 in the coupler, and therefore the pin 45, will not be swung through as great an angle when the lockng bail is pushed back by some extraneous force, as is the case when the bail is moved in the normal way by the uncoupling mechanism. In other words, the difference in lengths of movement is equal to the difference between the length of the notch 4 and the width of the projection 5 in the coupler. Therefore, if the locking bail is pushed back by some means other than the proper uncoupling appliances, the pin 45 will not reach the position shown in Fig. 3, but will come to rest in the position indicated in Fig. 4, either not in contact with the finger 44 or, perhaps just touching it so as not to trip the catch. Therefore, in the event of accidental uncoupling, the valves in the brake line on both couplers will be locked open and the air will escape and cause the brakes to be set.

I claim:—

1. The combination with a car coupler having a lock, a lock-actuating member having a lost motion connection with the lock, whereby the actuator moves through a greater distance when it is operated to move the lock into an idle position than when it is moved by the lock travelling to said idle position, of a conduit for fluids mounted on the coupler, a valve in said conduit, means for automatically coupling said conduit to a conduit on a cooperating coupler and opening said valve, a spring tending constantly to close the valve, a catch for locking said valve open, and a catch tripping device carried by the actuator for the coupler lock in such a position that the latch will be tripped when the lock actuator is moved in the normal manner for uncoupling but is not tripped when the lock actuator is moved by the coupler lock travelling into its release position.

2. The combination with a car coupler having a lock and an unlocking mechanism movable through a greater distance in normal uncoupling than when actuated by the lock upon accidental uncoupling of an air conduit on the coupler, a valve in said conduit, means for automatically coupling said conduit to a conduit on a cooperating coupler and opening said valve, a catch for holding said valve open, and an element on said uncoupling mechanism in position to trip the catch when moved its full distance in normal uncoupling and to be inoperative to trip the catch when said unlocking mechanism is moved by the lock in accidental uncoupling.

In testimony whereof, I sign this specification.

HERBERT E. VAN DORN.